United States Patent
Porzio et al.

(10) Patent No.: US 12,474,869 B2
(45) Date of Patent: Nov. 18, 2025

(54) RELIABLE AND EFFICIENT BOOT LOGICAL UNIT ACCESS

(71) Applicant: Micron Technology, Inc., Boise, ID (US)

(72) Inventors: Luca Porzio, Casalnuovo (IT); Rakeshkumar Dayabhai Vaghasiya, Hyderabad (IN); Roberto Izzi, Caserta (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/441,869

(22) Filed: Feb. 14, 2024

(65) Prior Publication Data
US 2024/0281169 A1      Aug. 22, 2024

Related U.S. Application Data

(60) Provisional application No. 63/486,386, filed on Feb. 22, 2023.

(51) Int. Cl.
*G06F 3/06* (2006.01)

(52) U.S. Cl.
CPC .......... *G06F 3/0659* (2013.01); *G06F 3/0605* (2013.01); *G06F 3/0632* (2013.01); *G06F 3/0679* (2013.01)

(58) Field of Classification Search
CPC .... G06F 3/0659; G06F 3/0605; G06F 3/0632; G06F 3/0679
See application file for complete search history.

(56) References Cited

U.S. PATENT DOCUMENTS

| | | | |
|---|---|---|---|
| 2011/0029726 A1* | 2/2011 | Fujimoto | G06F 11/1433 711/170 |
| 2013/0283027 A1* | 10/2013 | Brooks | G06F 8/65 713/2 |
| 2014/0040605 A1* | 2/2014 | Futral | G06F 9/445 713/2 |
| 2016/0117225 A1* | 4/2016 | Yu | G06F 11/1666 714/15 |
| 2018/0267793 A1* | 9/2018 | Watanabe | G06F 3/0659 |
| 2020/0012487 A1* | 1/2020 | Lin | G06F 8/65 |
| 2020/0159302 A1* | 5/2020 | Chaiken | G06F 1/24 |
| 2021/0279048 A1* | 9/2021 | Ni | G06F 8/65 |
| 2024/0265964 A1* | 8/2024 | Yano | G11C 11/56 |

* cited by examiner

*Primary Examiner* — Edward J Dudek, Jr.
(74) *Attorney, Agent, or Firm* — Holland & Hart LLP

(57) ABSTRACT

Methods, systems, and devices for reliable and efficient boot logical unit access are described. For instance, a memory device may receive a request to write data to a boot logical unit of the memory device. The memory device may update a parameter from a first value to a second value based on receiving the request, the second value indicating a first stage of a procedure for updating the boot logical unit. The memory device may write, to a block of memory in the memory device, the data based on the parameter indicating the first stage of the procedure. Additionally or alternatively, the memory device may read a value of the parameter as part of a power up procedure and may perform a boot procedure using either first data at the boot logical unit or second data at the block of memory based on reading the value of the parameter.

18 Claims, 8 Drawing Sheets

RELIABLE AND EFFICIENT BOOT LOGICAL UNIT ACCESS

CROSS REFERENCE

The present application for patent claims priority to and the benefit of U.S. Provisional Application No. 63/486,386 by Porzio et al., entitled "RELIABLE AND EFFICIENT BOOT LOGICAL UNIT ACCESS," filed Feb. 22, 2023, assigned to the assignee hereof, and is expressly incorporated by reference in its entirety herein.

TECHNICAL FIELD

The following relates to one or more systems for memory, including reliable and efficient boot logical unit access.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states if disconnected from an external power source.

DETAILED DESCRIPTION

Figure 1:
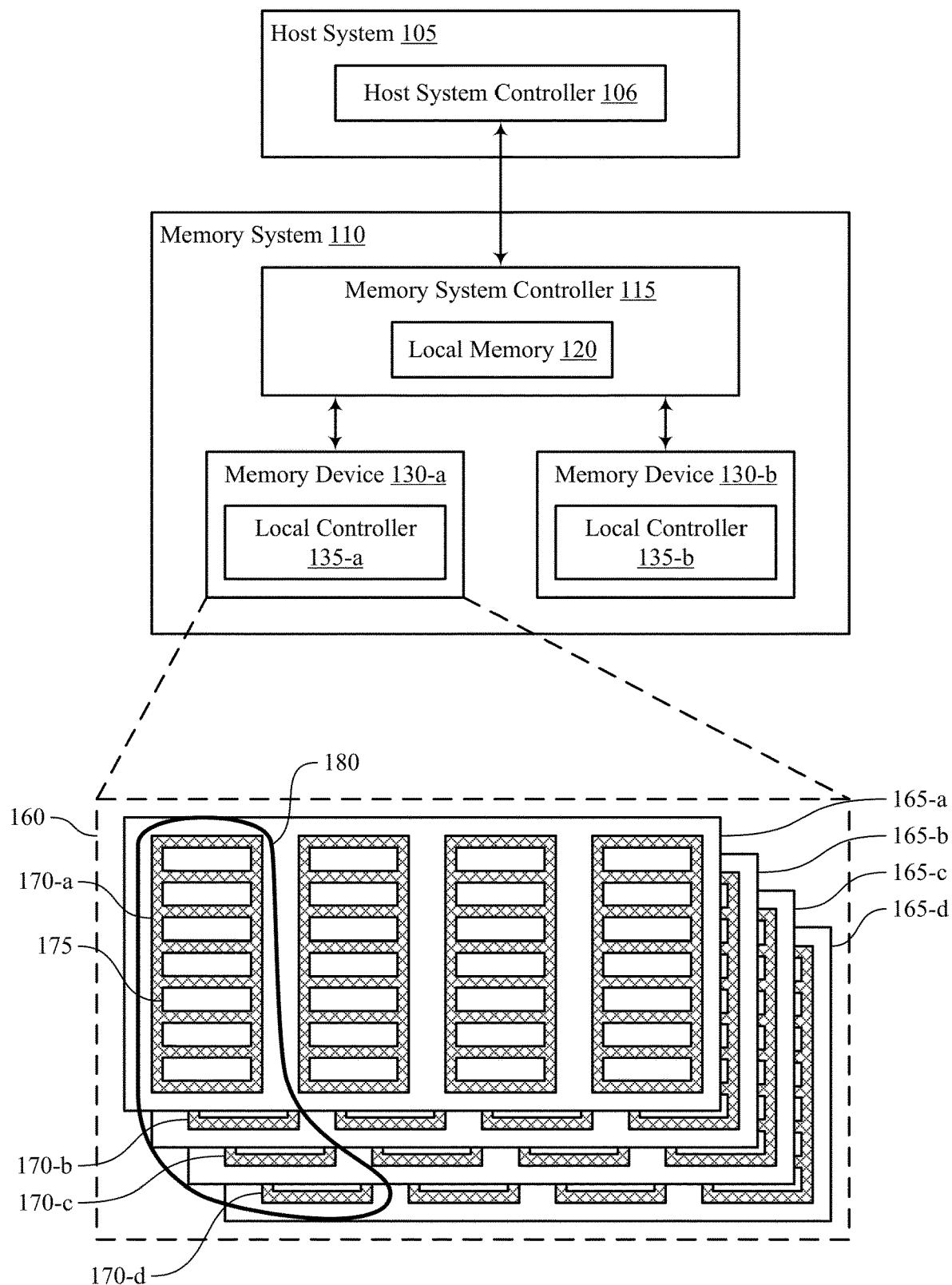
FIG. 1 illustrates an example of a system that supports reliable and efficient boot logical unit access in accordance with examples as disclosed herein.

A memory device (e.g., a NOT-AND (NAND) memory device) may include a boot logical unit (LU) that is accessed during a boot procedure for the memory device. In some examples, the memory device may need to update the boot LU. For instance, the memory device may receive new data to write to the boot LU and may write the new data to the boot LU. However, if an adverse event occurs, such as a power loss (e.g., an asynchronous power loss (APL)) occurs, during the process of writing the new data to the boot LU, the boot LU may include one or more errors if accessed during a boot procedure following the event. Accordingly, the memory device may fail to perform the boot procedure correctly due to the boot LU including one or more errors.

The techniques described herein enable a memory device mitigate errors that may be present at the boot LU if an adverse event, such as a power loss, occurs. For instance, upon receiving a request to write new data (e.g., updated data, other data) to the boot LU, the memory device may write the new data to a set of reserved memory blocks (e.g., reserved NAND memory blocks). Once written to the set of reserved memory blocks, the data may be written to the boot LU. In some examples, the memory device may store a first parameter (e.g., an APL trust marker) that may indicate whether to read from the boot LU or the reserved set of memory blocks after the adverse event, such as the power loss (e.g., an APL) occurs. For instance, the first parameter may indicate to access the boot LU while the new data is being written to the set of reserved memory blocks. Accordingly, if a power loss occurs while the new data is being written to the set of reserved memory blocks, the boot LU may be stable for access. However, once the new data is written to the set of reserved memory blocks, the first parameter may indicate to access the reserved set of memory blocks after a power loss (e.g., an APL) occurs (e.g., instead of accessing the boot LU). Thus, if the adverse event, such as the power loss (e.g., an APL), occurs while the data stored at the reserved set of memory blocks is being written to the boot LU, the memory device may not access the boot LU during the following boot-up procedure, as the boot LU may not be stable. Once the data is written to the boot LU, the first parameter may indicate to access the boot LU after the adverse event, such as the power loss (e.g., an APL) occurs.

In some examples, the memory device may store a second parameter (e.g., a secure state marker (SSM)) to track stages for updating the boot LU. For instance, the parameter may indicate a first stage in which the boot LU is not being updated; a second stage in which the data is being moved to the set of reserved memory blocks; a third stage in which the data has been fully moved to the set of reserved memory blocks; a fourth stage in which the data is written to the boot LU; one or more other stages; or any combination thereof. In the first and/or second stages, the first parameter (e.g., the APL trust marker) may indicate to access the boot LU during a boot procedure. In the third and/or fourth stage, the first parameter may indicate to access the reserved set of memory blocks during the boot procedure. By utilizing the first parameter, the memory device may avoid accessing the boot LU when it is unstable. Additionally, by utilizing the second parameter, the memory device may avoid restarting an update procedure for a boot LU from the beginning depending on a stage indicated by the second parameter, which may decrease a total latency associated with performing the update procedure.

Figure 2:
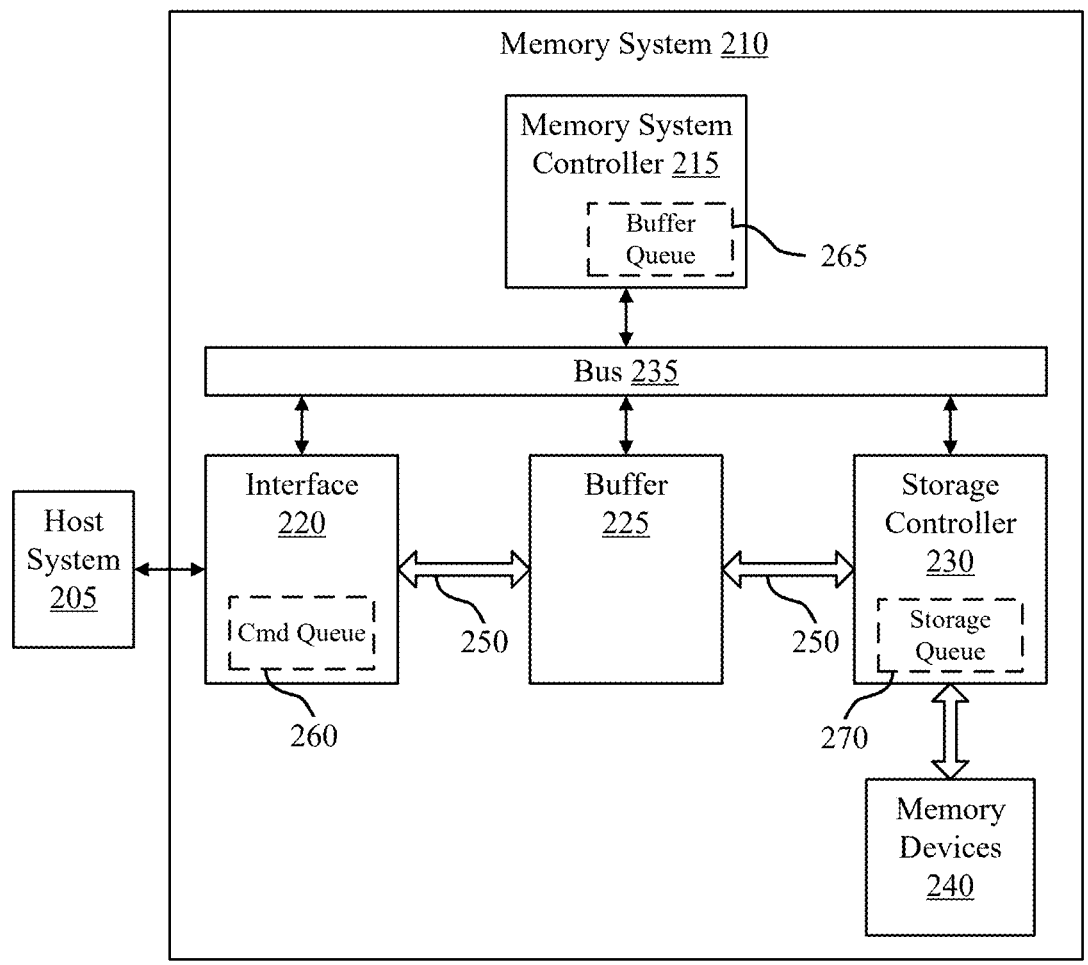
FIG. 2 illustrates an example of a system that supports reliable and efficient boot logical unit access in accordance with examples as disclosed herein.

Features of the disclosure are initially described in the context of systems, devices, and circuits with reference to FIGS. 1 through 2. Features of the disclosure are described in the context of a boot logical unit updating process, a boot up procedure, and a power loss procedure with reference to FIGS. 3 through 5. These and other features of the disclosure are further illustrated by and described in the context of an apparatus diagram and flowchart that relate to reliable and efficient boot logical unit access with reference to FIGS. 6 through 8.

FIG. 1 illustrates an example of a system 100 that supports reliable and efficient boot logical unit access in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated, which may be due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support reliable and efficient boot logical unit access. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The system 100 may include any quantity of non-transitory computer readable media that support reliable and efficient boot logical unit access. For example, the host system 105, the system controller 115, a memory device 130-*a*, or a memory device 130-*b* may include or otherwise may access one or more non-transitory computer readable media storing instructions (e.g., firmware) for performing the functions ascribed herein to the host system 105, system controller 115, memory device 130-*a*, or memory device 130-*b*. For example, such instructions, if executed by the host system 105 (e.g., by the host system controller 106), by the system controller 115, by a memory device 130-*a* (e.g., by a local controller 135-*a*), or by a memory device 130-*b* (e.g., by a local controller 135-*b*), may cause the host system 105, system controller 115, memory device 130-*a*, or memory device 130-*b* to perform associated functions as described herein A memory device (e.g., memory device 130-*a*, memory device 130-*b*) may include a boot LU) that is accessed during a boot procedure for the memory device. In some examples, the memory device may update the boot LU. For instance, the memory device may receive new data to write to the boot LU and may write the new data to the boot LU. However, if a power loss (e.g., an asynchronous power loss (APL)) occurs during the process of writing the new data to the boot LU, the boot LU may include errors if accessed during a boot procedure following the power loss. Accordingly, the memory device may fail to perform the boot procedure correctly.

The techniques described herein may enable a memory device mitigate errors that may become present at the boot LU if power loss occurs. For instance, upon receiving a request to write new data to the boot LU, the memory device may write the new data to a set of reserved memory blocks (e.g., reserved NAND memory blocks, blocks 170, one or more of blocks 170-*a*, 170-*b*, 170-*c*, or 170-*d*). Once written to the set of reserved memory blocks, the data may be written to the boot LU. In some examples, the memory device may store a first parameter (e.g., an APL trust marker) that may indicate whether to read from the boot LU or the reserved set of memory blocks after a power loss (e.g., an APL) occurs. For instance, the first parameter may indicate to access the boot LU while the new data is being written to the set of reserved memory blocks. Accordingly, if a power loss occurs while the new data is being written to the set of reserved memory blocks, the boot LU may be stable for access. However, once the new data is written to the set of reserved memory blocks, the first parameter may indicate to access the reserved set of memory blocks after a power loss (e.g., an APL) occurs (e.g., instead of accessing the boot LU). Thus, if a power loss (e.g., an APL) occurs while the data stored at the reserved set of memory blocks is being written to the boot LU, the memory device may not access the boot LU during the following boot-up procedure, as the boot LU may not be stable. Once the data is written to the boot LU, the first parameter may indicate to access the boot LU after a power loss (e.g., an APL) occurs.

In some examples, the memory device may store a second parameter (e.g., a secure state marker (SSM)) to keep track of stages for updating the boot LU. For instance, the parameter may indicate a first stage in which the boot LU is not being updated; a second stage in which the data being moved to the set of reserved memory blocks; a third stage in which the data has been fully moved to the set of reserved memory blocks; a fourth stage in which the data is written to the boot LU; or any combination thereof. In the first and/or second stages, the first parameter (e.g., the APL trust marker) may indicate to access the boot LU during a boot procedure. In the third and/or fourth stage, the first parameter may indicate to access the reserved set of memory blocks during the boot procedure.

FIG. 2 illustrates an example of a system 200 that supports reliable and efficient boot logical unit access in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on (e.g., in response to) the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

After the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

A memory device (e.g., one or more of memory devices 240) may include a boot LU) that is accessed during a boot procedure for the memory device. In some examples, the memory device may update the boot LU. For instance, the memory device may receive new data to write to the boot LU and may write the new data to the boot LU. However, if a power loss (e.g., an asynchronous power loss (APL)) occurs during the process of writing the new data to the boot LU, the boot LU may include errors if accessed during a boot procedure following the power loss. Accordingly, the memory device may fail to perform the boot procedure correctly.

The techniques described herein may enable a memory device mitigate errors that may become present at the boot LU if power loss occurs. For instance, upon receiving a request to write new data to the boot LU, the memory device may write the new data to a set of reserved memory blocks (e.g., reserved NAND memory blocks). Once written to the set of reserved memory blocks, the data may be written to the boot LU. In some examples, the memory device may store a first parameter (e.g., an APL trust marker) that may indicate whether to read from the boot LU or the reserved set of memory blocks after a power loss (e.g., an APL) occurs. For instance, the first parameter may indicate to access the boot LU while the new data is being written to the set of reserved memory blocks. Accordingly, if a power loss occurs while the new data is being written to the set of reserved memory blocks, the boot LU may be stable for access. However, once the new data is written to the set of reserved memory blocks, the first parameter may indicate to access the reserved set of memory blocks after a power loss (e.g., an APL) occurs (e.g., instead of accessing the boot LU). Thus, if a power loss (e.g., an APL) occurs while the data stored at the reserved set of memory blocks is being written to the boot LU, the memory device may not access the boot LU during the following boot-up procedure, as the boot LU may not be stable. Once the data is written to the boot LU, the first parameter may indicate to access the boot LU after a power loss (e.g., an APL) occurs.

In some examples, the memory device may store a second parameter (e.g., a secure state marker (SSM)) to keep track of stages for updating the boot LU. For instance, the parameter may indicate a first stage in which the boot LU is not being updated; a second stage in which the data being moved to the set of reserved memory blocks; a third stage in which the data has been fully moved to the set of reserved memory blocks; a fourth stage in which the data is written to the boot LU; or any combination thereof. In the first and/or second stages, the first parameter (e.g., the APL trust marker) may indicate to access the boot LU during a boot procedure. In the third and/or fourth stage, the first parameter may indicate to access the reserved set of memory blocks during the boot procedure.

Figure 3:
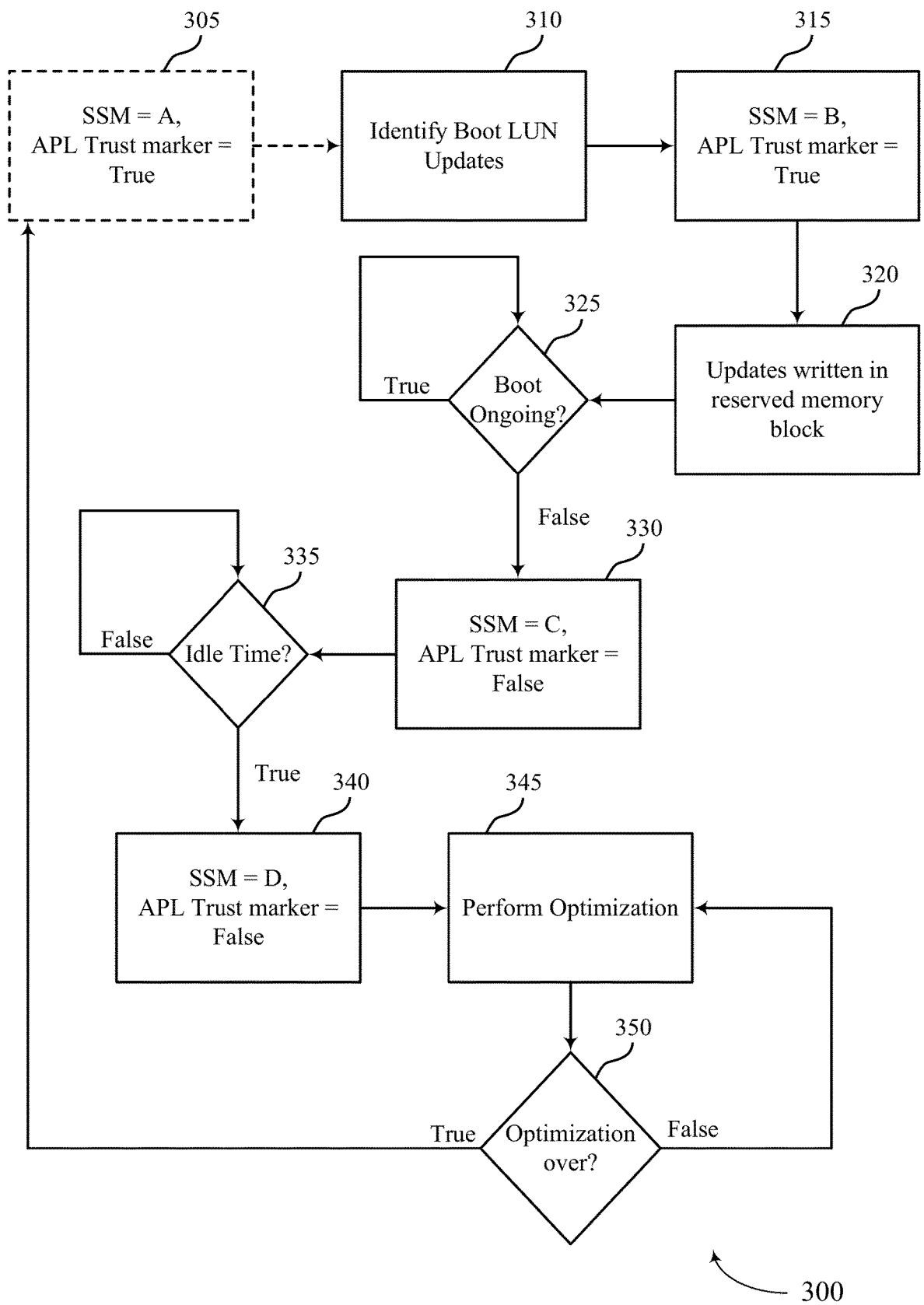
FIG. 3 illustrates an example of a boot logical unit updating process that supports reliable and efficient boot logical unit access in accordance with examples as disclosed herein.

FIG. 3 illustrates an example of a boot logical unit updating process 300 that supports reliable and efficient boot logical unit access in accordance with examples as disclosed herein. In some examples, boot logical unit updating process may be implement by one or more aspects of systems 100 and/or 200. For instance, each of 305, 310, 315, 320, 325, 330, 335, 340, 345, and 350 may be implemented by one or more of memory device 110, memory device 130-*a*, memory device 130-*b*, memory system 210, or memory devices 240. Aspects of the boot logical unit updating process 300 may be implemented by a controller, among other components. Additionally or alternatively, aspects of the boot logical unit updating process 300 may be implemented as instructions stored in memory (e.g., firmware stored in a memory coupled with memory device 130-*a*). For example, the instructions, if executed by a controller (e.g., the memory system controller 115), may cause the controller to perform the operations of the boot logical unit updating process 300.

In some examples, decreasing latency associated with boot up (e.g., ensuring reliable or predictable latency) may enable a memory device to be used in applications (e.g., automotive applications) more quickly and may, accordingly, improve boot performance. The techniques described herein may enable average decreased latency for boot logical unit number (LUN) access (e.g., universal flash storage (UFS) boot LUN access). Additionally or alternatively, the techniques described herein may enable boot LUN access to occur independent of power loss (e.g., independent of APL occurrence).

For instance, firmware for a memory device (e.g., a managed NAND (MNAND) device) may maintain a logical address to physical address (L2P) table for a boot LU. If this table is accessed for a write (for instance if a boot LU is being written to), the firmware may add into the system tables a marker (e.g., an APL trust marker, an SSM) that the boot LU is being written to and may be in an unstable state. If the update is finished and the contents in the boot LU are marked as stable, the marker may be updated to indicate that the boot LU contents are stable (e.g., a marker may be added to the system table to mark that the boot LU contents are stable). At each boot time, the memory device may check the marker in the system tables and, if the marker indicates a safe state, the firmware may grant access to the boot LU even if an APL occurs (e.g., regardless of the global APL state of the device, regardless of whether the memory device was switched off in a safe state or with a power loss). For instance, during boot up time (e.g., while the memory device is powered), the firmware for the memory device may check the marker status and if the marker is in the safe state, the firmware may access boot LU contents without performing power loss tests and/or other safe tests. Thus, the latency after the power loss occurs may be decreased. Additional aspects associated with performing the boot up procedure may be described herein, for instance, with reference to FIGS. 4 and 5.

If a boot LU write access is requested, the memory device firmware may perform a procedure before the boot LU update starts and/or after it has finished. For instance, at 305, the memory device may not be performing an update procedure for the boot LU. Accordingly, the SSM may indicate a first stage of the boot LU update procedure at which the update procedure is not being performed and/or the APL trust marker may indicate that the boot LU is stable. Once the boot LU write access is requested, the memory device may proceed to 310.

At 310, that boot LUN updates are to occur may be identified (e.g., by the memory device). In some examples, at 310, the memory device may write the SSM in a system table area to indicate that the boot LU is being updated. At 315, the SSM may be updated (e.g., by the memory device).

For instance, the SSM may be updated (e.g., from SSM=A to SSM=B) to indicate a second stage of the boot LU update procedure at which data is being written to a reserved memory block. After 315, the memory device may proceed to 320.

At 320, the updates (e.g., temporarily) may be written (e.g., by the memory device) for the boot LU to a reserved memory block (e.g., a reserved NAND block). After writing the updates to the reserved NAND block, at 325, whether a boot up procedure is still occurring (e.g., whether the boot LU is still being accessed) may be checked (e.g., by the memory device). If boot up procedure is still occurring, the memory device may remain at 325 until a boot up procedure is not occurring. If a boot up procedure is not occurring, the memory device may proceed at 330.

At 330, the SSM may be updated (e.g., from SSM=B to SSM=C) to indicate a third stage of the boot LU update procedure is occurring and/or the APL trust marker may be updated (e.g., true to false) to indicate that the boot LU is unstable after a power loss (e.g., an APL) occurs. After 330, the memory device may proceed to 335. At 335, if the memory device has detected an idle time (e.g., a time for the memory device to perform housekeeping) may be identified (e.g., by the memory device). If the memory device has not detected an idle time, the memory device may remain at 335 until an idle time is detected. If an idle time is detected, the memory device may proceed to 340. At 340, the SSM may be updated (e.g., from SSM=C to SSM=D) to indicate a fourth stage of the boot LU update procedure is occurring.

After 340, the memory device may proceed to 345. At 345, optimization on the data stored at the reserved memory block may be performed (e.g., by the memory device). In some examples, performing the optimization may include collecting the boot LU data and making the boot LU more sequential. At 350, whether optimization is ongoing may be checked (e.g., by the memory device). If optimization is ongoing, the memory device may proceed to 345. If optimization is finished, the memory device may proceed to 305. At 305, the SSM may be updated (e.g., from SSM=D to SSM=A) to indicate the first stage of the boot LU update procedure (e.g., to indicate that the boot LU update procedure is finished) and/or the APL trust marker may be updated (e.g., false to true) to indicate that boot LU is stable after a power loss (e.g., an APL) occurs.

If an error or a power loss occurs during boot logical unit updating process 300, the firmware may perform one or more operations at a next reboot. For instance, if the error or power loss occurs between 310 and 330, the memory device the contents of the boot LU may be rolled back and the new contents (e.g., the boot LU updates) may be discarded. If the error or power loss occurs between 330 and 340, the memory device may access the boot LU data in the reserved blocks with potentially reduced performance (e.g., increased latency). If the error or power loss occurs at 340, 345, or 350, the memory device may access the boot LU data in the reserved blocks with potentially reduced performance. If the memory device finishes the boot LU update procedure (e.g., returns to 305), the boot LU data may be accessed by final destination blocks and may be used as soon as requested. Additional details associated with the one or more operations that occur after an error or power loss are described herein, for instance, with reference to FIGS. 4 and 5.

In some examples, the techniques described herein may have one or more advantages. For instance, boot LU data may be accessed with increased (e.g., maximum) available performance and/or access latency regardless of a stability of or errors in other partitions (e.g., as compared to updating the boot LU without using the reserved NAND blocks). Additionally or alternatively, the boot LU partition may be accessible even if problems occur in other partitions or if other partitions are less available. Additionally or alternatively, access to a roll back procedure and/or a reserved block redundant area may enable increased reliability and robustness for errors or problems that may occur while updating the boot LU. In some examples, SSM may have different values (e.g., 0, 1, 2, and 3 instead of A, B, C, and D for instance) and/or the APL trust marker may have different values (e.g., 0 or 1).

Figure 4:
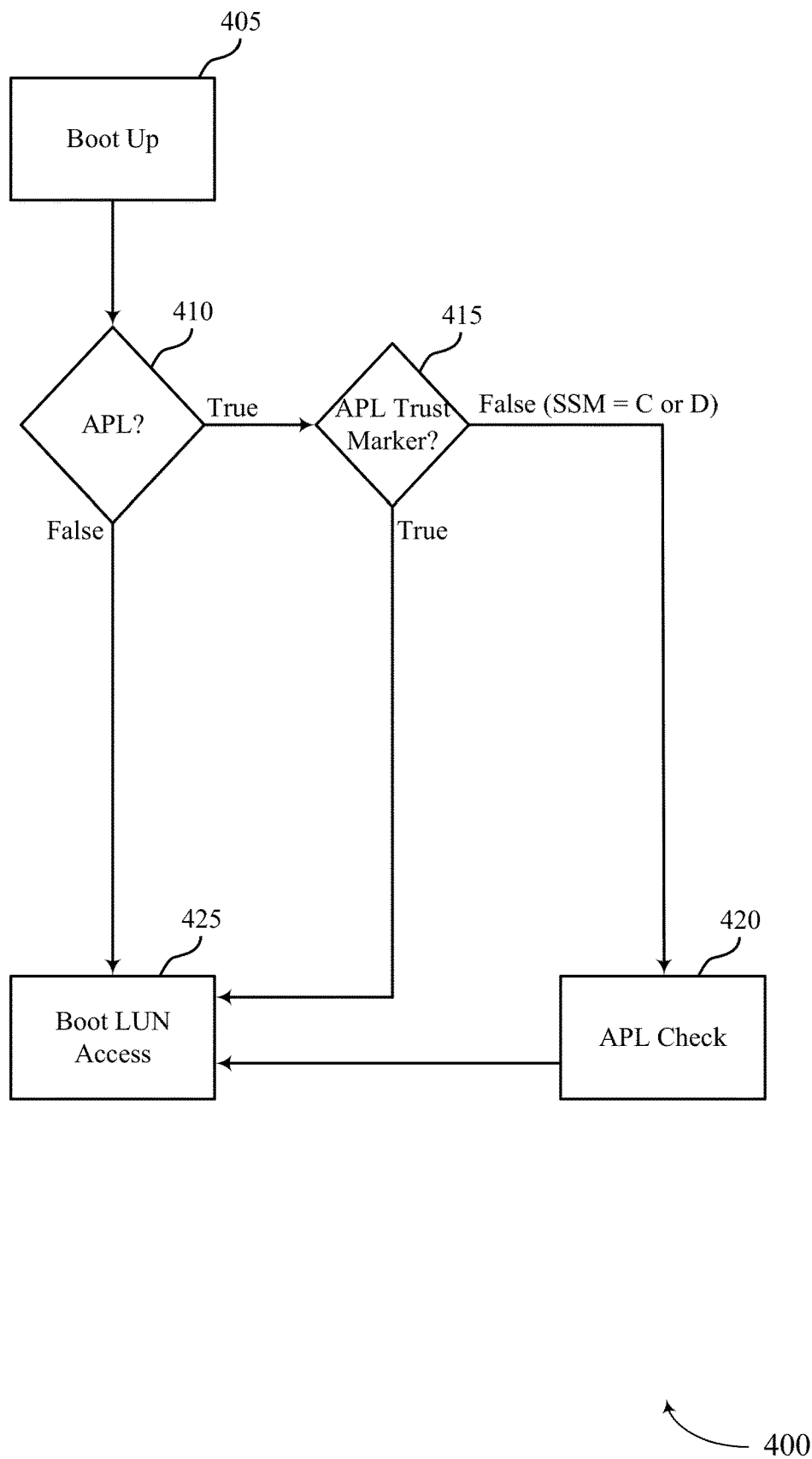
FIG. 4 illustrates an example of a boot up procedure that supports reliable and efficient boot logical unit access in accordance with examples as disclosed herein.

FIG. 4 illustrates an example of a boot up procedure 400 that supports reliable and efficient boot logical unit access in accordance with examples as disclosed herein. In some examples, boot up procedure 400 may implement one or more aspects of boot logical unit updating procedure 300. For instance, the values of the SSM and APL trust marker of FIG. 4 may correspond to the values as described in FIG. 3. Additionally, boot up procedure 400 may be an example of a procedure performed in response to an error or power loss (e.g., an APL) occurring during boot logical unit updating procedure 300. Aspects of the boot up procedure 400 may be implemented by a controller, among other components. Additionally or alternatively, aspects of the boot up procedure 400 may be implemented as instructions stored in memory (e.g., firmware stored in a memory coupled with memory device 130-a). For example, the instructions, if executed by a controller (e.g., the memory system controller 115), may cause the controller to perform the operations of the boot up procedure 400.

At 405, a memory device may begin booting up (e.g., the memory device may be coupled with a power source, the memory device may be powered up and/or powered on). The memory device may then proceed to 410. At 410, whether an APL has occurred or not may be determined (e.g., by the memory device). If it is determined that an APL has not occurred, the memory device may proceed to 425. If it is determined that an APL has occurred, the memory device may proceed to 415. At 415, whether the APL trust marker is true or false may be determined (e.g., by the memory device). If the APL trust marker is false (e.g., in which case SSM may be equal to C or D), the memory device may proceed to 420. However, if the APL trust marker is true, the memory device may proceed to 425. At 420, an APL check may be performed (e.g., by the memory device). After the APL check is performed, the memory device may proceed to 425. At 425, the boot LUN may be accessed (e.g., by the memory device). In some examples, system partition switching may be performed (e.g., a host device coupled with the memory device may access an A boot LU partition or a B LU partition). In some examples, system partition switching may be performed if the APL trust marker is true. In other examples, system partition switching may be performed regardless of a status of the APL trust marker and/or regardless of if an APL has occurred.

Figure 5:
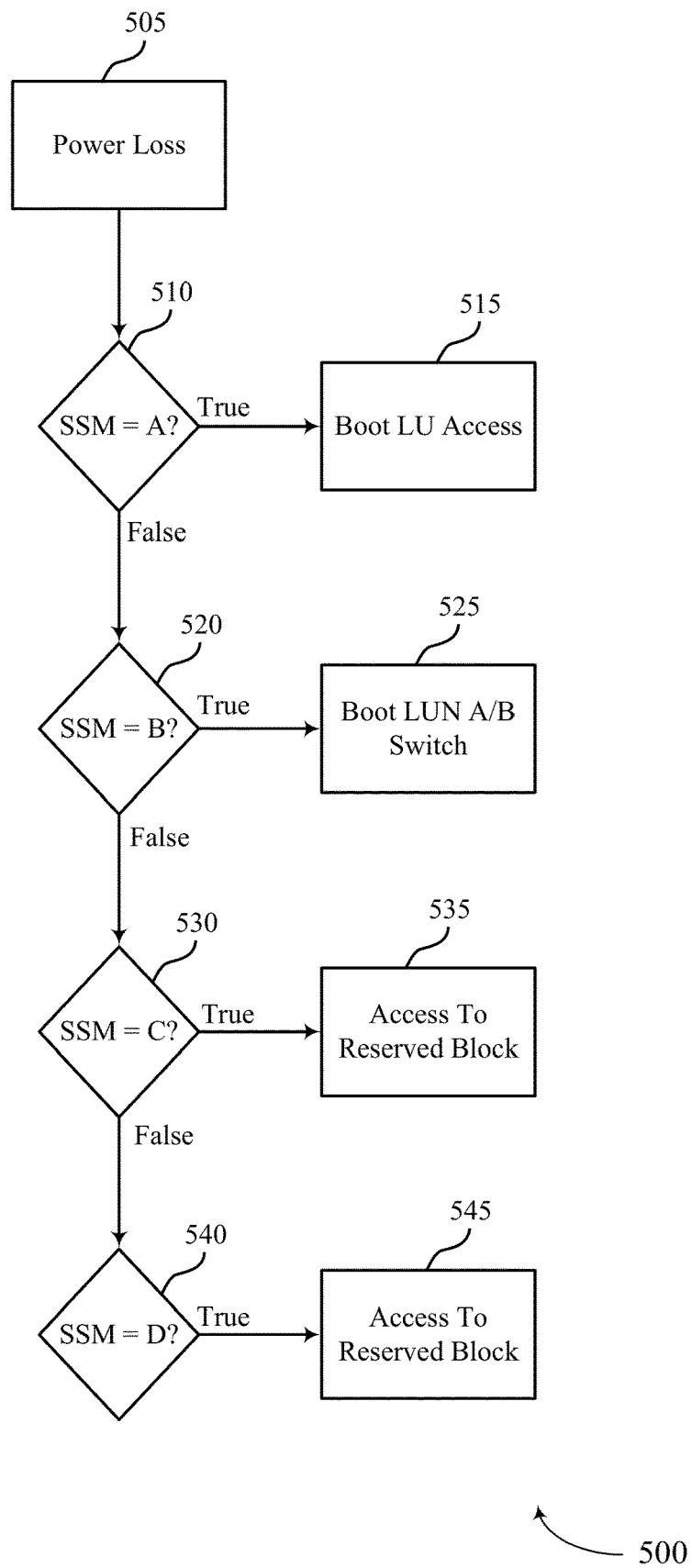
FIG. 5 illustrates an example of a power loss procedure that supports reliable and efficient boot logical unit access in accordance with examples as disclosed herein.

FIG. 5 illustrates an example of a power loss procedure 500 that supports reliable and efficient boot logical unit access in accordance with examples as disclosed herein. In some examples, power loss procedure 500 may implement one or more aspects of boot logical unit updating procedure 300. For instance, the values of the SSM and APL trust marker of FIG. 4 may correspond to the values as described in FIG. 3. Additionally, power loss procedure 500 may be an example of a procedure performed in response to an error or power loss (e.g., an APL) occurring during boot logical unit updating procedure 300. Aspects of the power loss procedure 500 may be implemented by a controller, among other components. Additionally or alternatively, aspects of the power loss procedure 500 may be implemented as instructions stored in memory (e.g., firmware stored in a memory coupled with memory device 130-a). For example, the instructions, if executed by a controller (e.g., the memory system controller 115), may cause the controller to perform the operations of the power loss procedure 500.

At 505, the memory device may experience a power loss (e.g., during boot logical unit updating procedure 300). The memory device may proceed to 510. At 510, whether SSM is equal to A (e.g., the first stage of the boot LU update procedure is occurring) may be determined. If SSM is equal to A, the memory device may proceed to 515. If not, the memory device may proceed to 520. At 515, boot LU access may be performed (e.g., by the memory device). At 520, whether SSM is equal to B (e.g., the second stage of the boot LU update procedure is occurring) may be determined (e.g., by the memory device). If the SSM is equal to B, the memory device may proceed to 525. If not, the memory device may proceed to 530. At 525, partition switching (e.g., an A/B switch) for the boot LUN may be performed (e.g., by a host device coupled with the memory device). At 530, whether SSM is equal to C (e.g., the third stage of the boot LU update procedure is occurring) may be determined (e.g., by the memory device). If SSM is equal to C, the memory device may proceed to 535. If not, the memory device may proceed to 540. At 535, the reserved block for the boot LU data may be accessed (e.g., by the memory device). At 540, the memory device may proceed to 545. At 545, the reserved block for the boot LU may be accessed (e.g., by the memory device, with increased performance and/or decreased latency as compared to 535).

Figure 6:
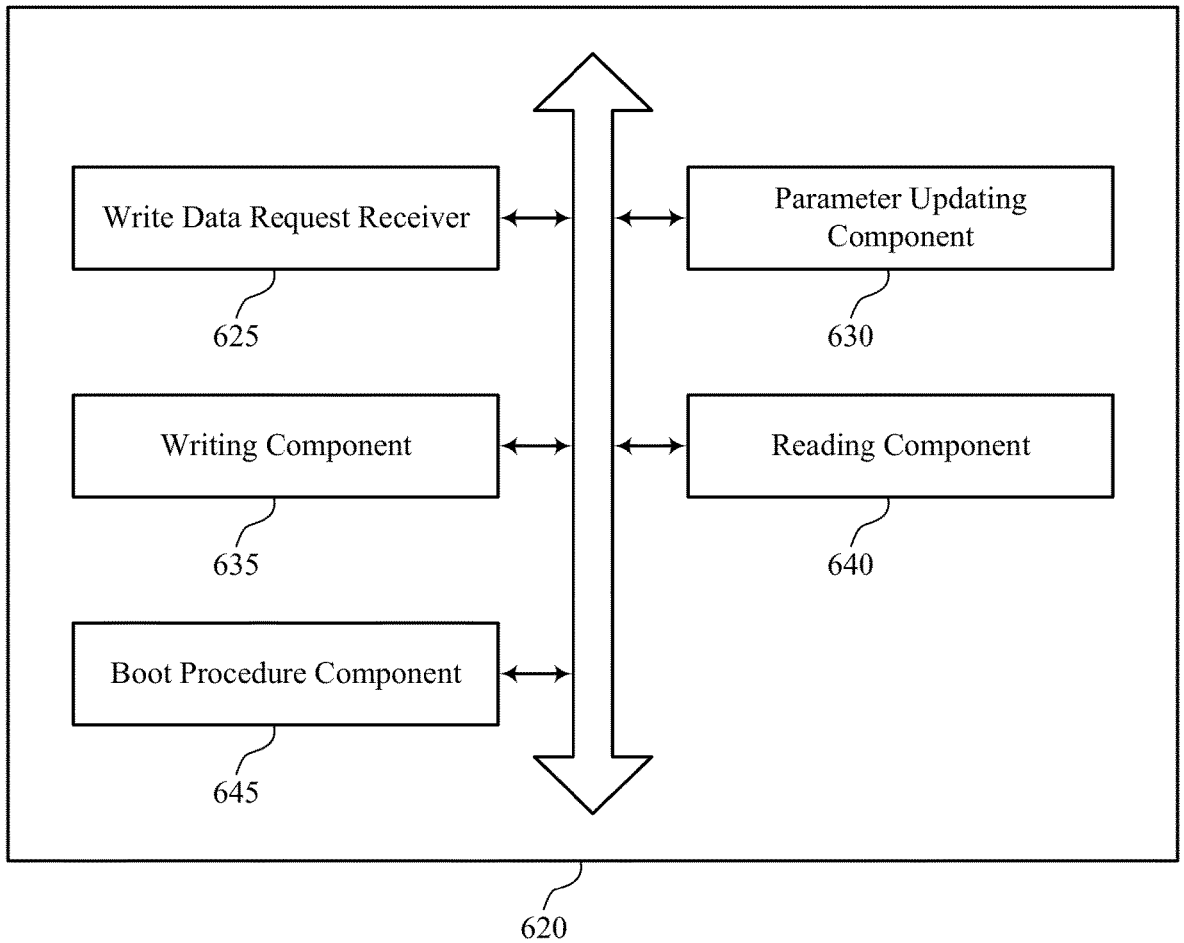
FIG. 6 illustrates a block diagram of a memory device that supports reliable and efficient boot logical unit access in accordance with examples as disclosed herein.

FIG. 6 illustrates a block diagram 600 of a memory device 620 that supports reliable and efficient boot logical unit access in accordance with examples as disclosed herein. The memory device 620 may be an example of aspects of a memory device as described with reference to FIGS. 1 through 5. The memory device 620, or various components thereof, may be an example of means for performing various aspects of reliable and efficient boot logical unit access as described herein. For example, the memory device 620 may include a write data request receiver 625, a parameter updating component 630, a writing component 635, a reading component 640, a boot procedure component 645, or any combination thereof. Each of these components may communicate, directly or indirectly, with one another (e.g., via one or more buses).

The write data request receiver 625 may be configured as or otherwise support a means for receiving a request to write data to a boot logical unit of a memory device. The parameter updating component 630 may be configured as or otherwise support a means for updating a parameter from a first value to a second value based at least in part on receiving the request to write the data to the boot logical unit of the memory device, the second value of the parameter indicating a first stage of a procedure for updating the boot logical unit. The writing component 635 may be configured as or otherwise support a means for writing, to a block of memory in the memory device, the data based at least in part on the parameter indicating the first stage of the procedure for updating the boot logical unit.

In some examples, the parameter updating component 630 may be configured as or otherwise support a means for updating the parameter from the second value to a third value based at least in part on writing the data to the block of memory in the memory device, the third value of the parameter indicating a second stage of the procedure for updating the boot logical unit, and where the third value is different than the first value.

In some examples, the writing component 635 may be configured as or otherwise support a means for writing the data at the block of memory in the memory device to the boot logical unit based at least in part on the parameter indicating the second stage of the procedure for updating the boot logical unit.

In some examples, the parameter updating component 630 may be configured as or otherwise support a means for updating the parameter from the third value to the first value based at least in part on writing the data at the block of memory in the memory device to the boot logical unit, the first value of the parameter indicating that no procedure for updating the boot logical unit is in process.

In some examples, to support updating the second value of the parameter to the third value of the parameter, the parameter updating component 630 may be configured as or otherwise support a means for updating the parameter from the second value to a fourth value based at least in part on writing the data to the block of memory in the memory device, the fourth value of the parameter indicating a third stage of the procedure for updating the boot logical unit, and where the fourth value is different than the first value. In some examples, to support updating the second value of the parameter to the third value of the parameter, the parameter updating component 630 may be configured as or otherwise support a means for updating a second parameter based at least in part on updating the parameter from the second value to the fourth value, where the second parameter indicates whether to access the boot logical unit or the block of memory if asynchronous power loss occurs. In some examples, to support updating the second value of the parameter to the third value of the parameter, the parameter updating component 630 may be configured as or otherwise support a means for updating the parameter from the fourth value to the third value based at least in part on toggling the second parameter.

In some examples, the parameter updating component 630 may be configured as or otherwise support a means for updating the second parameter based at least in part on updating the parameter from the third value to the parameter.

In some examples, the parameter is stored at a logical address to physical address table of the memory device.

In some examples, the memory device includes a NOT-AND (NAND) memory device. In some examples, the controller is coupled with the NAND memory device.

The reading component 640 may be configured as or otherwise support a means for reading a value of a parameter as part of a power up procedure, the value of the parameter indicating a stage of a procedure for updating a boot logical unit. The boot procedure component 645 may be configured as or otherwise support a means for performing a boot procedure using either first data at a boot logical unit or second data at a reserved block of memory of a memory device based at least in part on reading the value of the parameter.

In some examples, the reading component 640 may be configured as or otherwise support a means for reading a second parameter as part of the power up procedure, where reading the parameter whose value indicates the stage of the procedure is based at least in part on the second parameter indicating that an asynchronous power loss has occurred.

In some examples, the reading component 640 may be configured as or otherwise support a means for reading a third parameter as part of the power up procedure, where the third parameter indicates whether to perform the boot procedure using the first data at the boot logical unit or the second data at the reserved block of memory of the memory device.

In some examples, the boot procedure component 645 may be configured as or otherwise support a means for performing the boot procedure using the first data at the boot logical unit based at least in part on the value of the parameter indicating that the memory device has not completed writing the second data to the reserved block of memory or indicating that no procedure for updating the boot logical unit is in process.

In some examples, the boot procedure component 645 may be configured as or otherwise support a means for performing the boot procedure using the second data at the boot logical unit based at least in part on the value of the parameter indicating that the memory device has completed writing the second data to the reserved block of memory.

Figure 7:
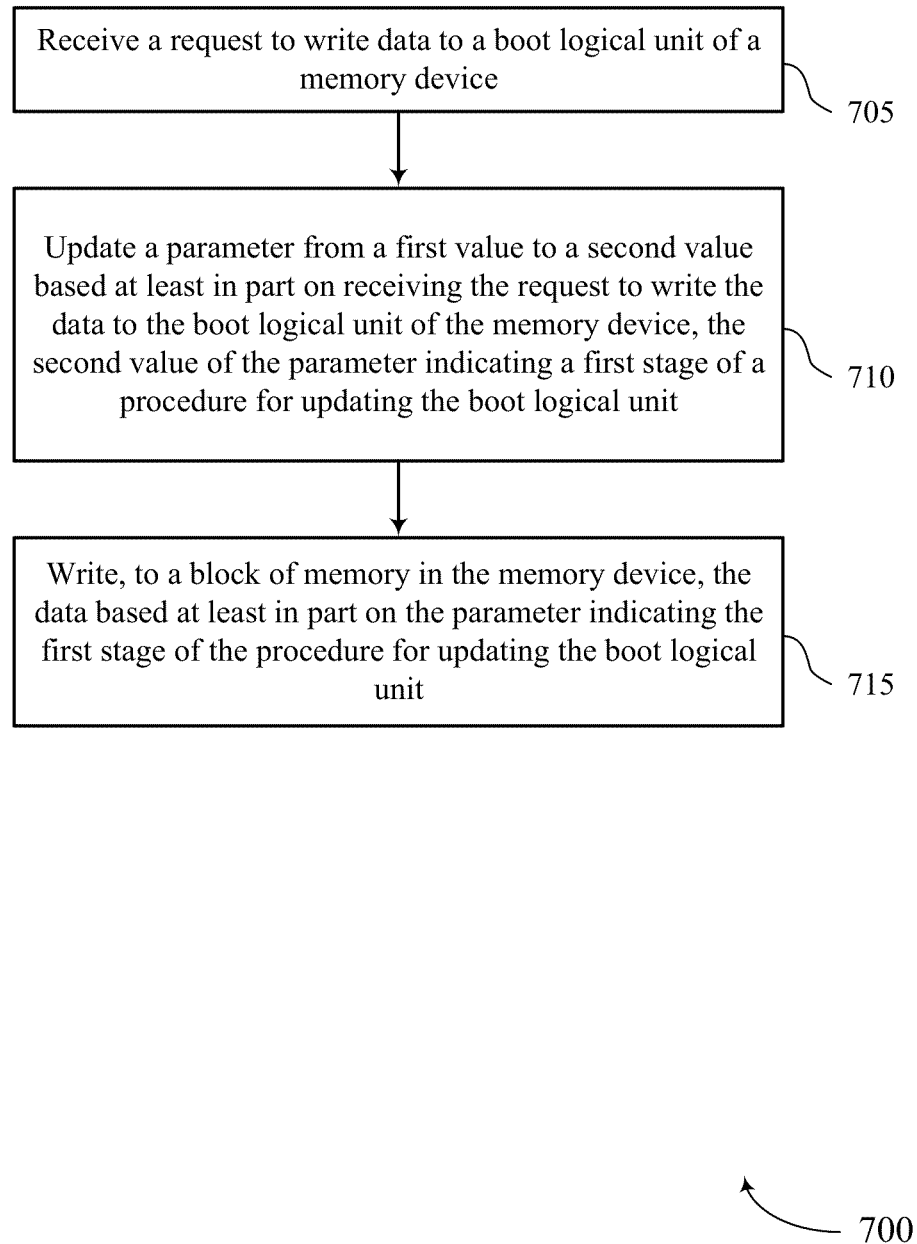
FIGS. 7 and 8 illustrate flowcharts showing a method or methods that support reliable and efficient boot logical unit access in accordance with examples as disclosed herein.

FIG. 7 illustrates a flowchart showing a method 700 that supports reliable and efficient boot logical unit access in accordance with examples as disclosed herein. The operations of method 700 may be implemented by a memory device or its components as described herein. For example, the operations of method 700 may be performed by a memory device as described with reference to FIGS. 1 through 6. In some examples, a memory device may execute a set of instructions to control the functional elements of the device to perform the described functions. Additionally, or alternatively, the memory device may perform aspects of the described functions using special-purpose hardware.

At 705, the method may include receiving a request to write data to a boot logical unit of a memory device. The operations of 705 may be performed in accordance with examples as disclosed herein. In some examples, aspects of the operations of 705 may be performed by a write data request receiver 625 as described with reference to FIG. 6.

At 710, the method may include updating a parameter from a first value to a second value based at least in part on receiving the request to write the data to the boot logical unit of the memory device, the second value of the parameter indicating a first stage of a procedure for updating the boot logical unit. The operations of 710 may be performed in accordance with examples as disclosed herein. In some examples, aspects of the operations of 710 may be performed by a parameter updating component 630 as described with reference to FIG. 6.

At 715, the method may include writing, to a block of memory in the memory device, the data based at least in part on the parameter indicating the first stage of the procedure for updating the boot logical unit. The operations of 715 may be performed in accordance with examples as disclosed herein. In some examples, aspects of the operations of 715 may be performed by a writing component 635 as described with reference to FIG. 6.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a request to write data to a boot logical unit of a memory device; updating a parameter from a first value to a second value based at least in part on receiving the request to write the data to the boot logical unit of the memory device, the second value of the parameter indicating a first stage of a procedure for updating the boot logical unit; and writing, to a block of memory in the memory device, the data based at least in part on the parameter indicating the first stage of the procedure for updating the boot logical unit.

Aspect 2: The method, apparatus, or non-transitory computer-readable medium of aspect 1, further including operations, features, circuitry, logic, means, or instructions, or any combination thereof for updating the parameter from the second value to a third value based at least in part on writing the data to the block of memory in the memory device, the third value of the parameter indicating a second stage of the procedure for updating the boot logical unit, and where the third value is different than the first value.

Aspect 3: The method, apparatus, or non-transitory computer-readable medium of aspect 2, further including operations, features, circuitry, logic, means, or instructions, or any combination thereof for writing the data at the block of memory in the memory device to the boot logical unit based at least in part on the parameter indicating the second stage of the procedure for updating the boot logical unit. Aspect 4: The method, apparatus, or non-transitory computer-readable medium of aspect 3, further including operations, features, circuitry, logic, means, or instructions, or any combination thereof for updating the parameter from the third value to the first value based at least in part on writing the data at the block of memory in the memory device to the boot logical unit, the first value of the parameter indicating that no procedure for updating the boot logical unit is in process.

Aspect 5: The method, apparatus, or non-transitory computer-readable medium of aspect 4, where updating the second value of the parameter to the third value of the parameter includes operations, features, circuitry, logic, means, or instructions, or any combination thereof for updating the parameter from the second value to a fourth value based at least in part on writing the data to the block of memory in the memory device, the fourth value of the parameter indicating a third stage of the procedure for updating the boot logical unit, and where the fourth value is different than the first value; updating a second parameter based at least in part on updating the parameter from the second value to the fourth value, where the second parameter indicates whether to access the boot logical unit or the block of memory if asynchronous power loss occurs; and updating the parameter from the fourth value to the third value based at least in part on toggling the second parameter.

Aspect 6: The method, apparatus, or non-transitory computer-readable medium of aspect 5, further including operations, features, circuitry, logic, means, or instructions, or any combination thereof for updating the second parameter based at least in part on updating the parameter from the third value to the parameter. Aspect 7: The method, apparatus, or non-transitory computer-readable medium of any of aspects 1 through 6, where the parameter is stored at a logical address to physical address table of the memory device. Aspect 8: The method, apparatus, or non-transitory computer-readable medium of any of aspects 1 through 7, where the memory device includes a NOT-AND (NAND) memory device and the controller is coupled with the NAND memory device.

Figure 8:
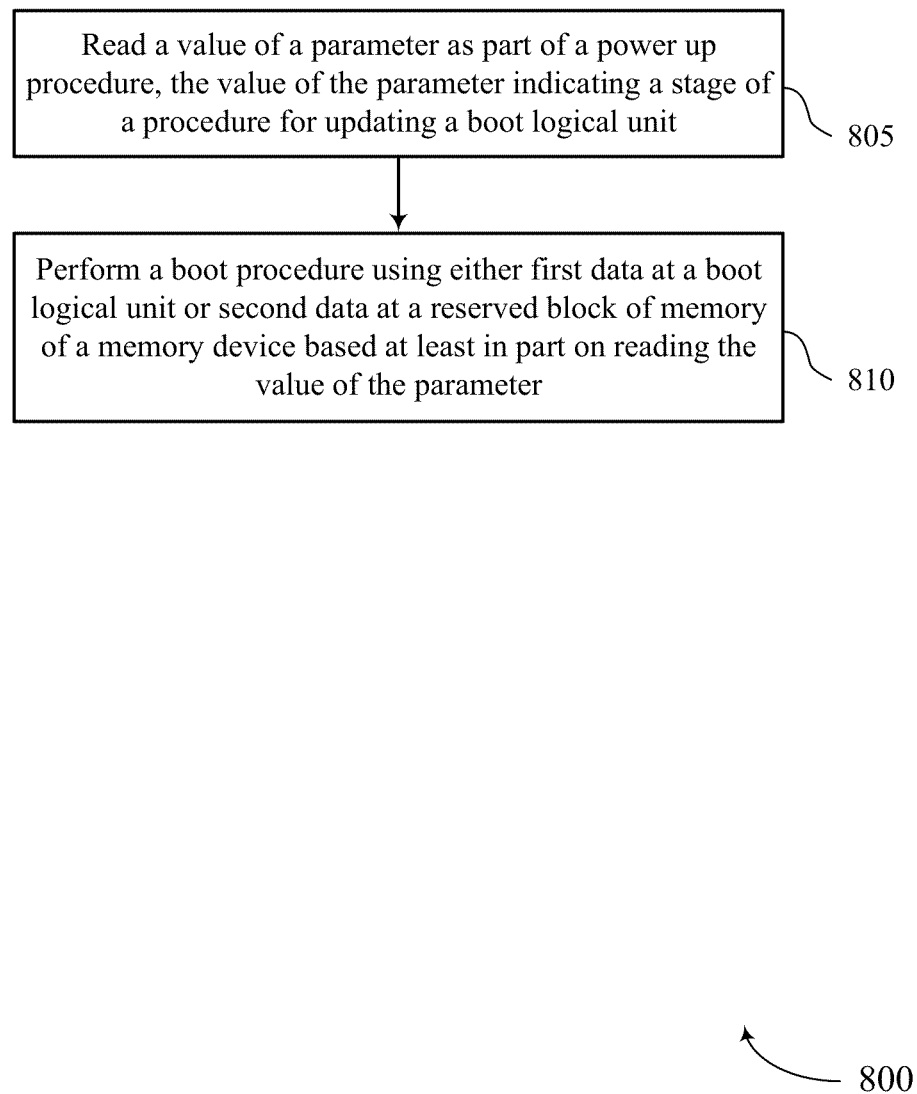

FIG. 8 illustrates a flowchart showing a method 800 that supports reliable and efficient boot logical unit access in accordance with examples as disclosed herein. The operations of method 800 may be implemented by a memory device or its components as described herein. For example, the operations of method 800 may be performed by a memory device as described with reference to FIGS. 1 through 6. In some examples, a memory device may execute a set of instructions to control the functional elements of the device to perform the described functions. Additionally, or alternatively, the memory device may perform aspects of the described functions using special-purpose hardware.

At 805, the method may include reading a value of a parameter as part of a power up procedure, the value of the parameter indicating a stage of a procedure for updating a boot logical unit. The operations of 805 may be performed in accordance with examples as disclosed herein. In some examples, aspects of the operations of 805 may be performed by a reading component 640 as described with reference to FIG. 6.

At 810, the method may include performing a boot procedure using either first data at a boot logical unit or second data at a reserved block of memory of a memory device based at least in part on reading the value of the parameter. The operations of 810 may be performed in accordance with examples as disclosed herein. In some examples, aspects of the operations of 810 may be performed by a boot procedure component 645 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 9: A method, apparatus, or non-transitory computer-readable medium including operations, features, circuitry, logic, means, or instructions, or any combination thereof for reading a value of a parameter as part of a power up procedure, the value of the parameter indicating a stage of a procedure for updating a boot logical unit and performing a boot procedure using either first data at a boot logical unit or second data at a reserved block of memory of a memory device based at least in part on reading the value of the parameter.

Aspect 10: The method, apparatus, or non-transitory computer-readable medium of aspect 9, further including operations, features, circuitry, logic, means, or instructions, or any combination thereof for reading a second parameter as part of the power up procedure, where reading the parameter whose value indicates the stage of the procedure is based at least in part on the second parameter indicating that an asynchronous power loss has occurred. Aspect 11: The method, apparatus, or non-transitory computer-readable medium of aspect 10, further including operations, features, circuitry, logic, means, or instructions, or any combination thereof for reading a third parameter as part of the power up procedure, where the third parameter indicates whether to perform the boot procedure using the first data at the boot logical unit or the second data at the reserved block of memory of the memory device.

Aspect 12: The method, apparatus, or non-transitory computer-readable medium of any of aspects 9 through 11, further including operations, features, circuitry, logic, means, or instructions, or any combination thereof for performing the boot procedure using the first data at the boot logical unit based at least in part on the value of the parameter indicating that the memory device has not completed writing the second data to the reserved block of memory or indicating that no procedure for updating the boot logical unit is in process. Aspect 13: The method, apparatus, or non-transitory computer-readable medium of any of aspects 9 through 12, further including operations, features, circuitry, logic, means, or instructions, or any combination thereof for performing the boot procedure using the second data at the boot logical unit based at least in part on the value of the parameter indicating that the memory device has completed writing the second data to the reserved block of memory.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 14: An apparatus, including: a memory device; and a controller coupled with the memory device and configured to cause the apparatus to: receive a request to write data to a boot logical unit of the memory device; update a parameter from a first value to a second value based at least in part on receiving the request to write the data to the boot logical unit of the memory device, the second value of the parameter indicating a first stage of a procedure for updating the boot logical unit; and write, to a block of memory in the memory device, the data based at least in part on the parameter indicating the first stage of the procedure for updating the boot logical unit. Aspect 15: The apparatus of aspect 14, where the controller is further configured to cause the apparatus to: update the parameter from the second value to a third value based at least in part on writing the data to the block of memory in the memory device, the third value of the parameter indicating a second stage of the procedure for updating the boot logical unit, and where the third value is different than the first value.

Aspect 16: The apparatus of aspect 15, where the controller is further configured to cause the apparatus to: write the data at the block of memory in the memory device to the boot logical unit based at least in part on the parameter indicating the second stage of the procedure for updating the boot logical unit. Aspect 17: The apparatus of aspect 16, where the controller is further configured to cause the apparatus to: update the parameter from the third value to the first value based at least in part on writing the data at the block of memory in the memory device to the boot logical unit, the first value of the parameter indicating that no procedure for updating the boot logical unit is in process. Aspect 18: The apparatus of aspect 17, where the controller being configured to cause the apparatus to update the second value of the parameter to the third value of the parameter includes the controller being configured to cause the apparatus to: update the parameter from the second value to a fourth value based at least in part on writing the data to the block of memory in the memory device, the fourth value of the parameter indicating a third stage of the procedure for updating the boot logical unit, and where the fourth value is different than the first value; update a second parameter based at least in part on updating the parameter from the second value to the fourth value, where the second parameter indicates whether to access the boot logical unit or the block of memory if asynchronous power loss occurs; and update the parameter from the fourth value to the third value based at least in part on toggling the second parameter.

Aspect 19: The apparatus of aspect 18, where the controller is further configured to cause the apparatus to: update the second parameter based at least in part on updating the parameter from the third value to the parameter. Aspect 20: The apparatus of any of aspects 14 through 19, where the parameter is stored at a logical address to physical address table of the memory device. Aspect 21: The apparatus of any of aspects 14 through 20, where the memory device includes a NOT-AND (NAND) memory device, and the controller is coupled with the NAND memory device.

An apparatus is described. The following provides an overview of aspects of the apparatus as described herein:

Aspect 22: An apparatus, including: a memory device; and a controller coupled with the memory device and configured to cause the apparatus to: read a value of a parameter as part of a power up procedure, the value of the parameter indicating a stage of a procedure for updating a boot logical unit; and perform a boot procedure using either first data at a boot logical unit or second data at a reserved block of memory of the memory device based at least in part on reading the value of the parameter. Aspect 23: The apparatus of aspect 22, where the controller is further configured to cause the apparatus to: read a second parameter as part of the power up procedure, where reading the parameter whose value indicates the stage of the procedure is based at least in part on the second parameter indicating that an asynchronous power loss has occurred. Aspect 24: The apparatus of aspect 23, where the controller is further configured to cause the apparatus to: read a third parameter as part of the power up procedure, where the third parameter indicates whether to perform the boot procedure using the first data at the boot logical unit or the second data at the reserved block of memory of the memory device.

Aspect 25: The apparatus of any of aspects 22 through 24, where the controller is configured to cause the apparatus to perform the boot procedure using the first data at the boot logical unit based at least in part on the value of the parameter indicating that the memory device has not completed writing the second data to the reserved block of memory or indicating that no procedure for updating the boot logical unit is in process.

Aspect 26: The apparatus of any of aspects 22 through 25, where the controller is configured to cause the apparatus to perform the boot procedure using the second data at the boot logical unit based at least in part on the value of the parameter indicating that the memory device has completed writing the second data to the reserved block of memory.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a memory device; and
a controller coupled with the memory device and configured to cause the apparatus to:
  receive a request to write data to a boot logical unit of the memory device;
  update a parameter from a first value to a second value based at least in part on receiving the request to write the data to the boot logical unit of the memory device, the second value of the parameter indicating a first stage of a procedure for updating the boot logical unit;
  write, to a block of memory in the memory device, the data based at least in part on the parameter indicating the first stage of the procedure for updating the boot logical unit; and
  update the parameter from the second value to a third value based at least in part on writing the data to the block of memory in the memory device, the third value of the parameter indicating a second stage of the procedure for updating the boot logical unit, wherein the third value is different than the first value.

2. The apparatus of claim 1, wherein the controller is further configured to cause the apparatus to:
  write the data at the block of memory in the memory device to the boot logical unit based at least in part on the parameter indicating the second stage of the procedure for updating the boot logical unit.

3. The apparatus of claim 2, wherein the controller is further configured to cause the apparatus to:
  update the parameter from the third value to the first value based at least in part on writing the data at the block of memory in the memory device to the boot logical unit, the first value of the parameter indicating that no procedure for updating the boot logical unit is in process.

4. The apparatus of claim 3, wherein the controller being configured to cause the apparatus to update the second value of the parameter to the third value of the parameter comprises the controller being configured to cause the apparatus to:
  update the parameter from the second value to a fourth value based at least in part on writing the data to the block of memory in the memory device, the fourth value of the parameter indicating a third stage of the procedure for updating the boot logical unit, and wherein the fourth value is different than the first value;
  update a second parameter based at least in part on updating the parameter from the second value to the fourth value, wherein the second parameter indicates whether to access the boot logical unit or the block of memory if asynchronous power loss occurs; and
  update the parameter from the fourth value to the third value based at least in part on updating the second parameter.

5. The apparatus of claim 4, wherein the controller is further configured to cause the apparatus to:
  update the second parameter based at least in part on updating the parameter from the third value to the first value.

6. The apparatus of claim 1, wherein the parameter is stored at a logical address to physical address table of the memory device.

7. The apparatus of claim 1, wherein:
the memory device comprises a NOT-AND (NAND) memory device, and
the controller is coupled with the NAND memory device.

8. An apparatus, comprising:
a memory device; and
a controller coupled with the memory device and configured to cause the apparatus to:
  read a value of a parameter as part of a power up procedure, the value of the parameter indicating a stage of a procedure for updating a boot logical unit, wherein reading the parameter is based at least in part on a second parameter that indicates that an asynchronous power loss has occurred during the procedure for updating the boot logical unit; and
  perform a boot procedure using either first data at a boot logical unit or second data at a reserved block of memory of the memory device based at least in part on reading the value of the parameter.

9. The apparatus of claim 8, wherein the controller is further configured to cause the apparatus to:
  read the second parameter as part of the power up procedure, wherein reading the parameter whose value indicates the stage of the procedure is based at least in part on the second parameter indicating that the asynchronous power loss has occurred.

10. The apparatus of claim 9, wherein the controller is further configured to cause the apparatus to:
  read, based at least in part on reading the parameter, a third parameter as part of the power up procedure, wherein the third parameter indicates whether to perform the boot procedure using the first data at the boot logical unit or the second data at the reserved block of memory of the memory device.

11. The apparatus of claim 8, wherein the controller is configured to cause the apparatus to perform the boot procedure using the first data at the boot logical unit based at least in part on the value of the parameter indicating that the memory device has not completed writing the second data to the reserved block of memory or indicating that no procedure for updating the boot logical unit is in process.

12. The apparatus of claim 8, wherein the controller is configured to cause the apparatus to perform the boot procedure using the second data at the reserved block of memory based at least in part on the value of the parameter indicating that the memory device has completed writing the second data to the reserved block of memory.

13. A non-transitory computer-readable medium storing code comprising instructions which, when executed by a processor of an electronic device, cause the electronic device to:

receive a request to write data to a boot logical unit of the electronic device;

update a parameter from a first value to a second value based at least in part on receiving the request to write the data to the boot logical unit of the electronic device, the second value of the parameter indicating a first stage of a procedure for updating the boot logical unit;

write, to a block of memory in the electronic device, the data based at least in part on the parameter indicating the first stage of the procedure for updating the boot logical unit; and update the parameter from the second value to a third value based at least in part on writing the data to the block of memory in the electronic device, the third value of the parameter indicating a second stage of the procedure for updating the boot logical unit; wherein the third value is different than the first value.

14. The non-transitory computer-readable medium of claim 13, wherein the instructions, when executed by the processor of the electronic device, further cause the electronic device to write the data at the block of memory in the electronic device to the boot logical unit based at least in part on the parameter indicating the second stage of the procedure for updating the boot logical unit.

15. The non-transitory computer-readable medium of claim 14, wherein the instructions, when executed by the processor of the electronic device, further cause the electronic device to update the parameter from the third value to the first value based at least in part on writing the data at the block of memory in the electronic device to the boot logical unit, the first value of the parameter indicating that no procedure for updating the boot logical unit is in process.

16. The non-transitory computer-readable medium of claim 15, wherein the instructions to update the second value of the parameter to the third value of the parameter, when executed by the processor of the electronic device, cause the electronic device to:

update the parameter from the second value to a fourth value based at least in part on writing the data to the block of memory in the electronic device, the fourth value of the parameter indicating a third stage of the procedure for updating the boot logical unit, and wherein the fourth value is different than the first value;

update a second parameter based at least in part on updating the parameter from the second value to the fourth value, wherein the second parameter indicates whether to access the boot logical unit or the block of memory if asynchronous power loss occurs; and update the parameter from the fourth value to the third value based at least in part on updating the second parameter.

17. The non-transitory computer-readable medium of claim 16, wherein the instructions, when executed by the processor of the electronic device, further cause the electronic device to update the second parameter based at least in part on updating the parameter from the third value to the first value.

18. The non-transitory computer-readable medium of claim 13, wherein the parameter is stored at a logical address to physical address table of the electronic device.

* * * * *